S. Zarley,
Wrench.
No. 97,849.    Patented Dec. 14, 1869.

Witnesses.
Wm. F. Clark
Alex F. Roberts

Inventor.
S. Zarley
per Munn &
Attorneys.

United States Patent Office.

SAMUEL ZARLEY, OF NIANTIC, ILLINOIS.

Letters Patent No. 97,849, dated December 14, 1869.

IMPROVEMENT IN MONKEY-WRENCH.

The Schedule referred to in these Letters Patent and making part of the same.

*To all whom it may concern:*

Be it known that I, SAMUEL ZARLEY, of Niantic, in the county of Macon, and State of Illinois, have invented a new and useful Improvement in Monkey-Wrenches; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to furnish an improved monkey-wrench, which shall be simple in construction, strong and durable, and easily and quickly adjusted to the nut to be unscrewed; and, It consists in the construction and combination of the various parts of the wrench, as hereinafter more fully described.

A is the stem, body, or shank of the wrench, to one end of which the stationary jaw B is securely attached.

Upon the other end of the stem A is attached the handle C, which is secured in place by a nut, D, screwed upon the end of the said stem A.

Figure 1:
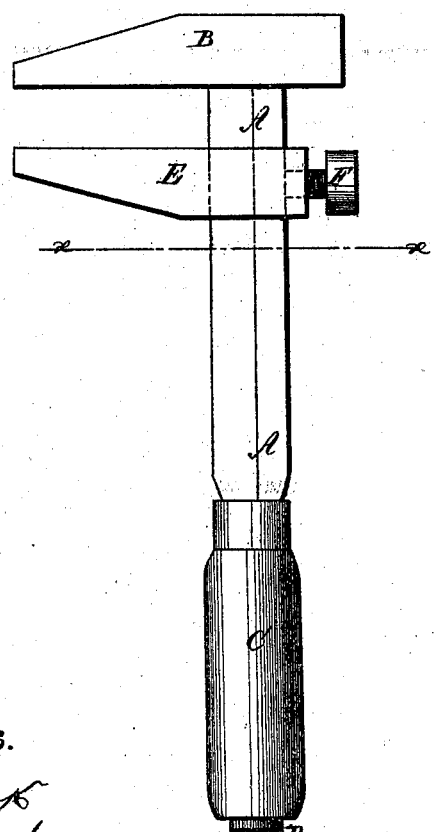
Figure 1 is a side view of my improved wrench.
Figure 2:
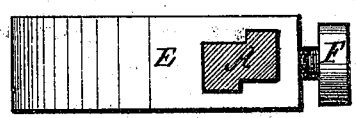
Figure 2 is a detail sectional view of the same, taken through the line $x\,x$, fig. 1.

The part of the stem A upon which the movable jaw E is placed is made with an offset upon each side, in opposite directions, as shown in fig. 2, to give more bearing-points to the movable jaw E, and thus give it a firmer seat upon said stem.

E is the movable jaw, the hole or opening through which for the stem A is made of the same form as the said stem A, so as to fit closely upon it.

F is a set-screw, which passes in through the rear end of the movable jaw E, and its forward end rests against the rear edge of the stem A, so as to secure the said jaw firmly in place when adjusted to the nut to be operated upon.

The adjacent faces of the jaws B and E are roughened, or corrugated, to enable them to take a surer hold upon the nut or other article to be held.

Having thus described my invention,

I claim as new, and desire to secure by Letters Patent—

The wrench, composed of the stem or shank A, shouldered on its opposite sides, the sliding jaw E, its set-screw F, and the fixed jaw B, all constructed, arranged, and operating as herein shown and described.

SAMUEL ZARLEY.

Witnesses:
 THOS. A. PRITCHETT,
 JOHN P. FARIS.